United States Patent [19]
Ancker

[11] 3,874,833
[45] Apr. 1, 1975

[54] APPARATUS FOR THE CALENDERING OF LAMINATED POLYMERIC MATERIALS

[75] Inventor: Fred H. Ancker, Warren, N.J.

[73] Assignee: Union Carbide Corporation, New York, N.Y.

[22] Filed: July 9, 1974

[21] Appl. No.: 486,750

Related U.S. Application Data

[63] Continuation-in-part of Ser. No. 229,349, Feb. 25, 1972, which is a continuation-in-part of Ser. No. 839,292, July 7, 1969, Pat. No. 3,658,978.

[52] U.S. Cl.................. 425/115, 425/113, 425/131
[51] Int. Cl............................................ B29f 3/012
[58] Field of Search ........... 425/122, 117, 126, 115, 425/113, 114, , 130, 131, 363, 382

[56] References Cited
UNITED STATES PATENTS

| | | | |
|---|---|---|---|
| 3,339,234 | 9/1967 | Utz | 425/363 X |
| 3,443,277 | 5/1969 | Frielivgsdorf | 425/115 X |
| 3,550,202 | 12/1970 | Fairbanks | 425/131 X |
| 3,608,035 | 9/1971 | Frohlich | 425/115 X |
| 3,611,492 | 10/1971 | Scheibling | 425/131 |
| 3,694,119 | 9/1972 | Scheibling | 425/131 |

Primary Examiner—J. Howard Flint, Jr.
Attorney, Agent, or Firm—Gerald R. O'Brien

[57] ABSTRACT

Apparatus is for the calendering of laminated polymeric materials, comprising a pair of cylindrical counter-rotating calender rolls positioned to define therebetween a nip opening, and volumetric obstruction means positioned across the width and between said pair of calender rolls, said obstruction means projecting into the space between said pair of calender rolls so as to at least penetrate the bank of material otherwise formed between the pair of calender rolls upstream of the nip by the selection of calendering conditions, said obstruction means having a central slot across its width for the feeding of a web of laminating material to said pair of calender rolls enclosed between two side slots for the extrusion of two streams of polymeric material to said pair of calender rolls.

4 Claims, 7 Drawing Figures

APPARATUS FOR THE CALENDERING OF LAMINATED POLYMERIC MATERIALS

This is a continuation-in-part of my copending application Ser. No. 229,349, filed Feb. 25, 1972 and entitled "Calendering of Laminated Polymeric Material," which is, in turn, a continuation-in-part of my application Ser. No. 839,292, filed July 7, 1969, entitled "Calendering of Polymeric Materials," and now U.S. Pat. No. 3,658,978.

The present invention relates to calendering of laminated plastic materials and, more particularly, to novel apparatus for making multilayer laminates between a pair of counter-rotating rolls.

In my copending patent application Ser. No. 839,292, filed July 7, 1969 entitled "Calendering of Polymeric Materials," a method is disclosed for controlling the fluid flow between a pair of counter-rotating rolls. That method provides marked simplifications in the conventional calendering process and apparatus and enables extension of the basic calendering process to a broad range of materials and thicknesses not heretofore calenderable. Also, substantial increases in throughput rates are thereby made possible in comparison to standard extrusion and calendering processes.

The present invention extends this flow control teaching to novel and improved apparatus for making multilayer laminates and is particularly suited for making laminates having a core of expanded plastic.

As defined herein, the following terms are understood to have the following meanings:

"Calendering" is the forming of a flowable plastic material into film or sheet by passing it between one or more pairs of counter-rotating rolls, i.e., in calendering, the fluid is greatly compressed in the thickness direction by passing thru the roll nip. In other words, the ratio of the bank "diameter" (shortest distance between the points where the fluid touches both rolls on the ingress side) to the sheet thickness (shortest distance between the points where the fluid touches both rolls on the egress side) is considerably larger than unity, in fact, usually ten to a thousand fold.

"Flowable plastic material" is a polymeric material commonly understood by those skilled in the art to be capable of being calendered and/or extruded. Examples of such materials include most addition polymers; polyolefins such as polyethylene, polypropylene, polybutene (1), poly-4-methyl pentene (1), polyisobutylene and copolymers thereof; polydienes such as polybutadiene, polyisoprene, polychloroprene, polycyanoprene and copolymers thereof, specifically copolymers with styrene and/or acrylonitrile; vinyl polymers such as polystyrene, poly α-methyl styrene, polyvinyl chloride, polyvinyl acetate and copolymers thereof; polyacrylic acid and polymethacrylic acid, their esters and salts; polyformal; polyalkylene oxides and their copolymers; polyaryl ethers such as polyphenylene oxide; polyvinylidene chloride and copolymers thereof; and copolymers of acrylonitrile with styrene and with vinyl chloride.

Included are also thermoplastic cellulosic materials such as ethyl cellulose, cellulose acetate, cellulose butyrate, hydroxy propyl cellulose and the like.

Other examples cover standard condensation polymers: polyesters such as polyethylene terephthalate and polethylene isophtalate; polyamids such as poly-ε-caprolactam, polyhexamethylene adipamide and polyhexamethylene sebacamide; Bisphenol A polycarbonate: polysulfones; and thermoplastic polyurethanes such as the fiber-forming polymer made from hexamethylene diisocyanate and tetramethylene glycol and the elastomeric polymer made from diphenylmethane-p,p'-diisocyanate, adipic acid and butanediol 1,4.

"Streams of molten flowable plastic material" are continuous sheets of molten or doughlike plastic material such as are normally fed to one nip of a multi-roll calender from a preceding roll nip and as would, for example, be formed by continuous extrusion of such plastic material through a wide slot die.

"Laminating webs" are lengths of web material capable of being bonded in a roll nip to molten flowable, plastic material to form a multi-ply laminate, hereinafter referred to as "laminated materials." Examples of such laminating webs include solid webs such as aluminum foil, paper, crepe paper, Glassine, Cellophane, polyester film and the like; woven webs such as cotton cloth, cheese cloth, glass fabrics, knitted fabrics, and the like; nonwoven webs such as felt, chopped or swirl glass matting, non-woven fabrics and the like; a warp of parallel filaments, such as glass fibers, boron fibers, carbon or graphite fibers, abestos yarns, and the like which are employed for making pre-preg (filaments pre-impregnated with polymeric material) to form composite tapes; and foraminous webs such as porous, cellular or sponge-like cellulosic, plastic or metal sheeting, expanded plastic or metal mesh or netting, etc.

The heat "flowable plastic materials" of the present disclosure are further characterized in terms of their non-Newtonian power-law viscosity parameters ($c_o$ and $n$). Writing the power law in the following form $$\mu = \mu_o (\dot{\gamma}/\dot{\gamma}_o)^n = \mu_o \dot{\gamma}^n$$

the viscosity parameters are defined as
$\mu$ = apparent melt viscosity (lbs. sec. in$^{-2}$)
$\dot{\gamma}$ = shear rate (sec$^{-1}$)
$\mu_o$ = viscosity value extrapolated to unity rate of shear ($\dot{\gamma} = 1$ sec$^{-1}$)
$n$ = power law exponent In accordance with the present invention, apparatus is provided for the calendering of laminated polymeric materials comprising a pair of cylindrical counter-rotating calender rolls positioned to define therebetween a nip opening, and volumetric obstruction means positioned across the width between said pair of calender rolls, said obstruction means projecting into the space between said pair of calender rolls so as to at least penetrate the bank of material otherwise formed between the pair of calender rolls upstream of the nip by the selection of calendering conditions, said obstruction means having a control slot across its width for the feeding of a web of laminating material to said pair of calender rolls enclosed between two slide slots for the extrusion of two streams of polymeric material to said pair of calender rolls.

In the drawings:

FIG. 1 is a cross-sectional schematic view of a typical conventional calendering bank.

FIGS. 2a and 2b are schematic drawings of the hydrostatic pressure profile and flow zones for a typical calendering situation (calendering 25 mil rigid polyvinyl chloride on a calender with 12 inch diameter rolls)

Figure 1:
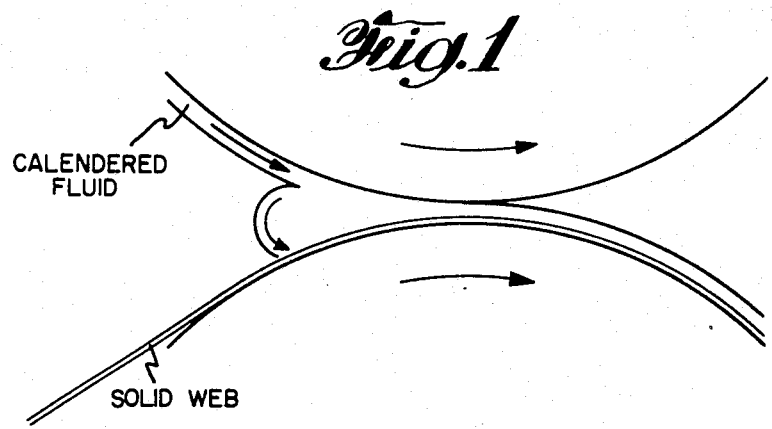

For a detailed discussion of the fluid flow phenomena in the nip between a pair of counter-rotating rolls, reference is made to my prior U.S. Pat. No. 3,658,978 and the references quoted therein. However, in order to appreciate the improvements in forming laminates by calendering in a single roll nip, which are made possible in apparatus of the present invention, it is instructive here to consider briefly the flow of a conventional calendering bank. As shown in FIG. 1, a calendering bank will usually rotate away from the entering fluid stream and it is, therefore, impossible to introduce a solid, woven or non-woven web into the center of the fluid; the web will immediately be pushed aside. Accordingly, in a roll nip with a conventional calendering bank, the only stable positions for introducing a web is along the roll surfaces and there is only one free roll surface in each nip. Therefore, if only one roll nip is used, a laminate can be made only with the flowable plastic material on one side, the web on the other side. If two roll nips are available, i.e., on a calender having three or more rolls, it is possible to make a sandwich laminate with the plastic material in the center and the two laminating webs on the outside by sequential calender laminating in two roll nips.

A special variation of conventional calender coating is the so-called "frictioning" technique used for impregnating fabrics with highly viscous and elastic rubber compounds. In this case, the shear forces which already are high in the standard calender coating process are further increased by using different speeds on the two rolls which constitute the coating or "frictioning" nip. This technique is, therefore, limited to very strong and tough fabrics which can withstand the very high shearing forces of this process.

The other extreme of current roll coating is embossing laminating in a roll nip substantially without any calendering bank. In this case there is very little reduction in the thickness of the stream of flowable plastic material as it passes through the roll nip and only a very light pressure is therefore applied between the coating and the solid laminating web. Although this technique overcomes the above problems of damaging weak laminating webs such as swirl glass mats, extensible foams, netting, knitted fabrics, etc., the low hydrostatic pressure often causes problems in poor penetration, wetting and adhesion of the plastic coating to the laminating web.

A special type of composite laminate which has broad commercial utility is foam cored sheeting. Such laminates are now generally made by low pressure roll, belt or press lamination of pre-made foamed sheeting to various non-porous solid laminating webs. It would be very desirable, however, to be able to form such foam core laminates directly by in-situ foaming and expansion of expandable plastic material in a single roll nip but such an approach has not been practical so far. The reason is the air-rejecting behavior of a standard calendering roll nip discussed in my U.S. Pat. No. 3,658,978. Thus, if a foamed mass of plastic is fed to a roll pair with a close nip setting, much of the gas in the foamed bank will be pushed backwards and escape into the atmosphere. Furthermore, the flow pattern in a conventional calendering bank precludes well controlled joining of foamable and non-foamable plastic streams for the purpose of in-situ formation of foam core plastic laminates.

Accordingly, it is the purpose of the present invention to provide apparatus which enables the preparation of multilayered composite laminates by suitable passage of flowable plastic streams and laminating webs through a single roll nip.

It is another purpose to provide means for applying high hydrostatic pressures and at the same time low shear forces in a roll nip, thus enabling calender laminating of weak or extensible laminating webs without tearing and distortion.

It is still another purpose to provide means and apparatus for making foamed sheeting with non-porous skins by in situ expansion of flowable plastic materials in a roll nip.

These and other objectives are accomplished by the present invention which provides a system for markedly improving the control of the polymer melt flow in a roll nip as well as provides additional positions for stable tracking of laminating webs in a roll nip. These improvements are achieved by inserting into the roll nip a volumetric obstruction which at least in part blocks the backward flow of fluid in the roll nip and thus enables positive control of the flow of the fluid streams between the obstruction and each roll surface. Additional improvements are achieved by providing a slot in the obstruction through which either a laminating web or a separate fluid stream or both can be introduced. If the center fluid stream is an expandable flowable plastic material, a flow system is achieved which is particularly advantageous for making foam core laminates.

Figure 2A:
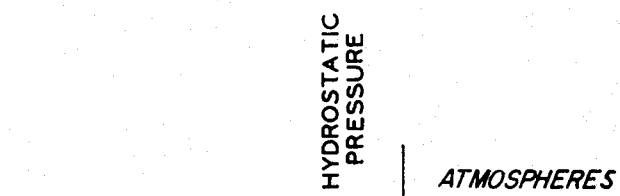
Figure 2B:
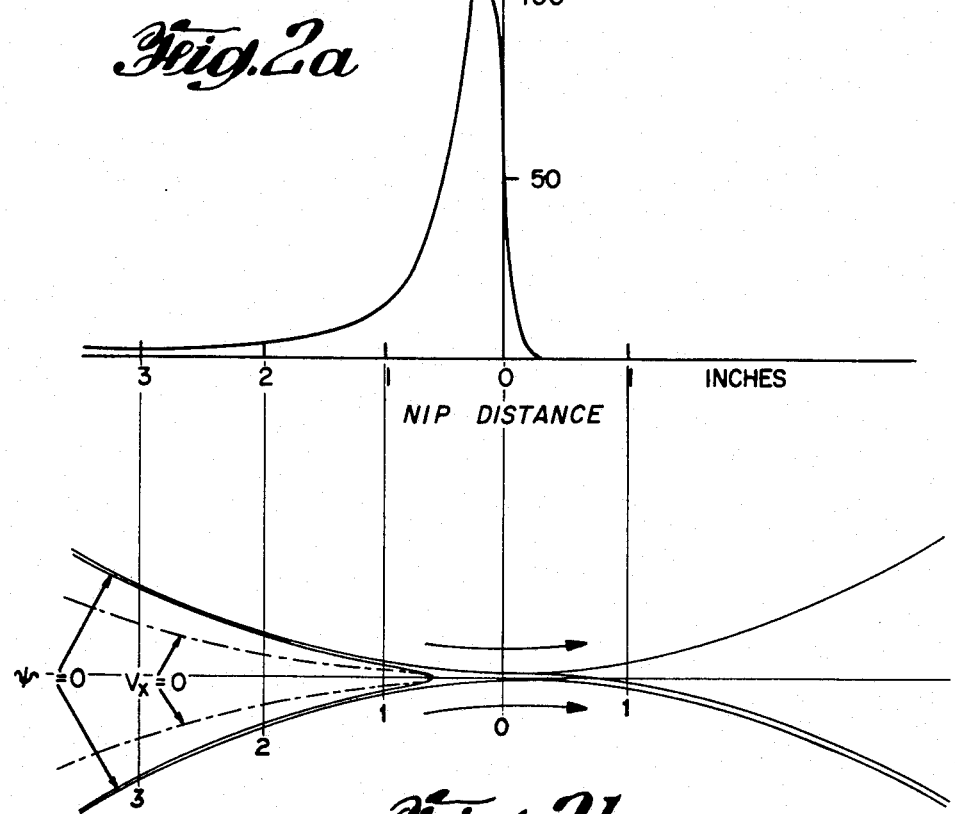

The flow systems which form the basis for this invention have the major advantage over current lowpressure laminating and coating in that the laminate is formed under calendering rather than embossing conditions. This enables utilization of the very high hydrostatic pressures which can be developed in calendering, i.e., when the rolls are used to form the melt into film and sheeting by a substantial compression of the fluid as it traverses the roll nip. As an illustration, FIG. 2a shows the hydrostatic pressure profile developed during calendering of 25 mil rigid PVC on a 12 inch roll diameter calender. It is seen that a maximum hydrostatic pressure exceeding one hundred atmospheres exists in the roll nip and a pressure several times that of the atmosphere exists well into the stagnant flow zone, the boundary of which is indicated by the curve designated $\psi = o$ as shown in FIG. 2b. Thus, introduction of a laminating web in the center of the fluid stream where the shear stress is near zero enables excellent wetting, penetration and adhesion due to the high hydrostatic pressure, yet fragile and extensible webs can be used because of the very low shear forces. Similarly, expandable fluid streams can be introduced with no or only minor expansion of the plastic until after the fluid traverses the roll nip resulting in greatly improved flow and process control for making foam cored sheeting.

Embodiments of the invention are shown in FIGS. 3 through 6.

Figure 3:
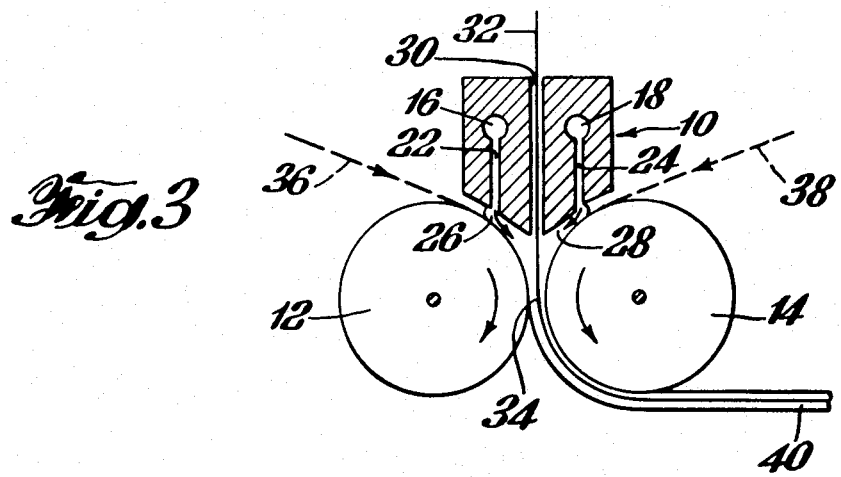
FIG. 3 is a cross-sectional schematic view of apparatus embodying the present invention.
Figure 4:
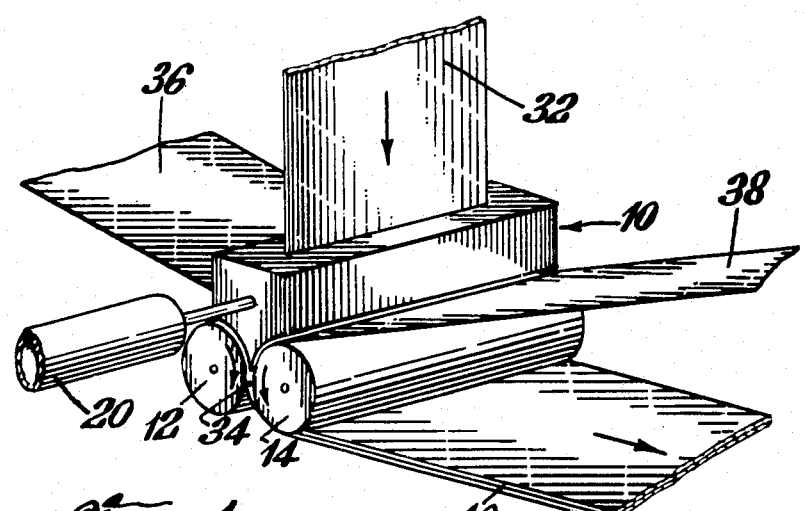
FIG. 4 is a perspective view of the extrudercalender apparatus of FIG. 3.

Referring specifically to the apparatus of FIGS. 3 and 4, an extruder die 10 is provided having a shape which will project into the bank of material which would otherwise form between counter-rotating rolls 12 and 14 of a calender. The die 10 extends across substantially the full width of the calender and has internal manifold passages 16 and 18 which receive molten, polymeric material from extruder 20 and feed it through die passages 22 and 24 to the passages 26 and 28 formed between opposite sides of die 10 and calender rolls 12 and 14.

Die 10 is also provided with a substantially axial passage 30 which permits the feeding of laminating sheet 32 directly to the nip 34 of the calender, between the two outer streams of molten, flowable polymeric material entering the nip through passages 26 and 28.

Additional webs or sheets of material 36 and 38 may optionally be fed, if desired, to the outer surfaces of rolls 12 and 14 to provide an outer surface for the resulting laminate 40.

The central laminating sheet, streams of molten, flowable polymeric material, and optionally outer additional webs are all continuously fed to and combined by passage through the nip 34 of the calender to provide the resulting laminated polymeric material sheet 40.

It is, of course, to be understood that volumetric obstruction die 10 is maintained across the full width of and between calender rolls 12 and 14. It has been found that the most forward (downstream in the direction of material passage) projection of the obstruction should be positioned so as to at least penetrate the bank of material otherwise formed between the pair of calender rolls upstream of the nip by the selection of calendering conditions.

It has been found preferable that the most forward projection of the volumetric obstruction be positioned well within the space between the pair of calender rolls beyond the position of merely slight penetration of the bank of material being calendered. However, any positioning of the most forward projection of the volumetric obstruction (within such penetration of the bank) between the rolls will provide a significant reduction in back flow and consequently improved calendering results.

It was preferred that calendering operations be performed with the obstruction maintained at a sufficiently close distance to the nip to substantially reduce the calender back flow and thus eliminate the natural bank rotation typical of conventional calendering banks. This has been found capable of accomplishment by substantially contouring and positioning the volumetric obstruction with the stagnation zone or area as defined in my U.S. Pat. No. 3,658,978. However, as pointed out hereinabove, this contouring and positioning is by no means critical and the desired results are progressively accomplished as a more substantial portion of the back-flow zone becomes occupied by the volumetric obstruction.

As mentioned hereinabove, it is optionally within the purview of the present invention to introduce webs (same or different kinds) along the two roll surfaces, thus enabling the forming of complex composite laminates in a single roll pass. The webs applied along the roll surfaces may be selected for decorative purposes and in addition to the web materials already mentioned, decorative webs such as wood veneer, cork, embossed or engraved metal foil, burlap, printed or otherwise patterned paper, natural or synthetic fiber fabrics, etc. may be used as exterior surfacing for the final sheeting. Furthermore, the flowable plastic materials introduced through manifolds 16 and 18 may be supplied by individual extruders or other melt pumps and thus provide laminates with different plastic interlayers. Similarly, the laminating web 32 introduced through passage 30 may itself be a multilayer composite thus resulting in the formation of multilayer composite laminates 40.

Figure 5:
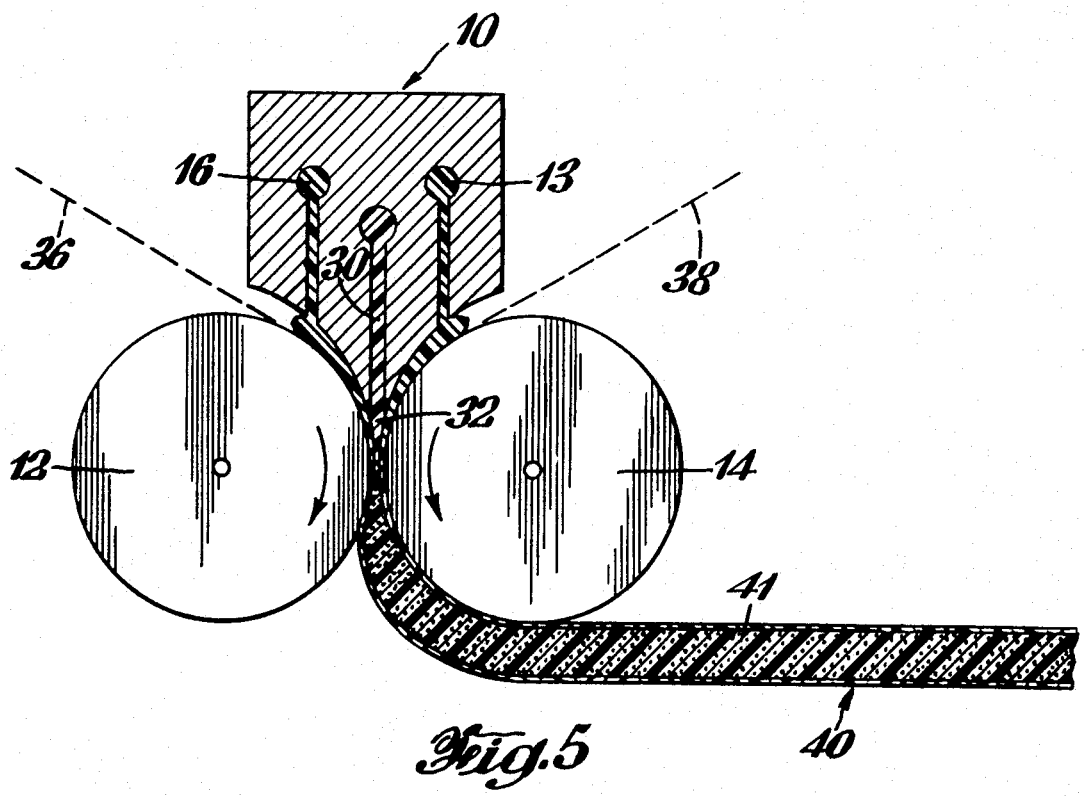
FIG. 5 is an elevational, cross-sectional schematic view of another embodiment of apparatus of the invention as employed for making foam cored plastic laminates.
Figure 6:
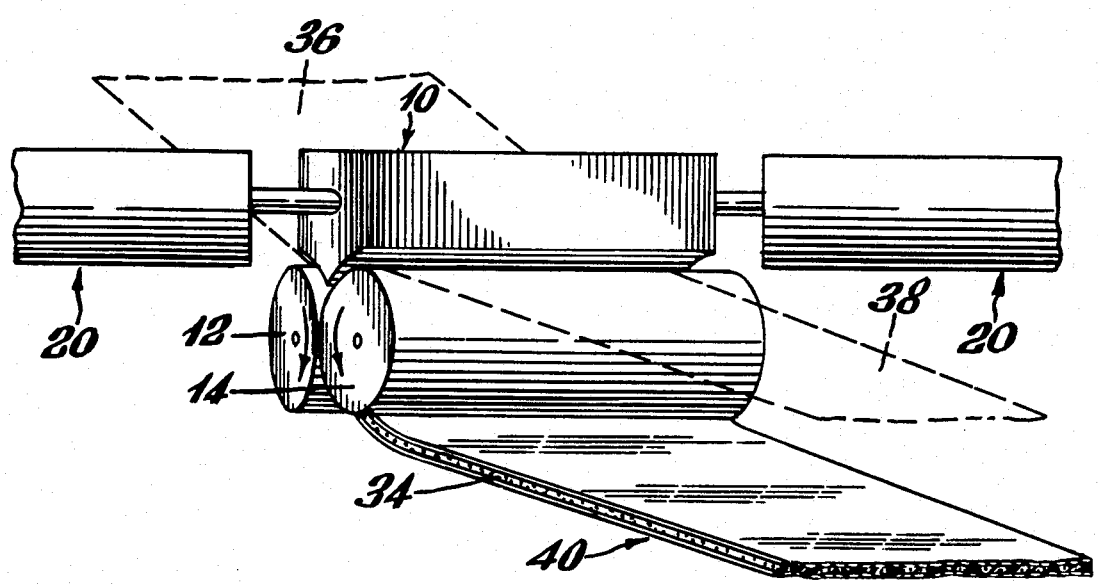
FIG. 6 is a perspective view of the extruder-calender apparatus of FIG. 5.

FIGS. 5 and 6 show an embodiment of the invention as employed for making foam core laminates.

As in the case of FIGS. 3 and 4, additional exterior laminating webs 36 and 38 may be introduced along the surfaces of rolls 12 and 14.

The flow system of the present invention conveniently circumvents the air rejection phenomenon of a conventional calendering bank referred to earlier. The expandable material in the center stream is enclosed on all sides and under elevated pressure until it has traversed the roll nip. Even then, the sheet surface consists of non-expandable plastic material and the gas is thus effectively trapped enabling the most efficient utilization of chemical blowing agents or injected gases.

A type of laminate which is becoming increasingly important is continuous fiber pre-pregs (pre-impregnated filaments) made from high strength, high modulus filaments such as graphite, boron or glass. These pre-pregs are webs of very accurately aligned and spaced filaments which are supplied to a coating apparatus as a warp, i.e., without any tranverse filaments (filling or woofing). The polymeric coating is usually an epoxy or polyimid pre-polymer which is B-staged or advanced subsequent to the impregnation step. The tapes are then used for building up composite structures for ultra high strength parts such as structural air and space crafts members by aligning the fibers according to the direction of the applied stresses. After final lay-up, the composites are fused together and cured by autoclavings.

It is extremely important to avoid formation of air bubbles in these composites because they becomes voids in the final composite which cause serious reduction in the mechanical properties of the composite by acting as stress raisers. Thus, the embodiment of the process shown in FIG. 3, when applied to high strength filament warp, can be operated to maximize the air rejection ability of a roll nip. This is done by operating with the minimum nip opening commensurate with the thickness of the filaments and having a fairly large amount of fluid surface at points 26 and 28 exposed to the atmosphere.

In the following examples, various equipment units are combined to accomplish the desired processing tasks.

The units are listed below:

| | Extruders | | |
|---|---|---|---|
| | No. 1 | No. 2 | No. 3 |
| Stages | single | single | two stage |
| Barrel Diameter | 3½" | 3½" | 2½" |
| L/D Ratio | 21 | 21 | 24 |
| Screw Helix | ←——— square pitch ———→ | | |
| First Screw Stage | | | |
| Channel Depth | 0.125" | 0.200" | 0.110" |
| Compression Ratio | 4.5 | 2.8 | 4.0 |
| Second Screw Stage | | | |
| Channel Depth | — | — | 0.135" |
| Compression Ratio | — | — | 3.7 |

The screw for the two stage extruder was provided with a 30 mil clearance blister at the end of the first metering section. The gas injection port is located in the extruder barrel immediately after this point.

| Type | Calender<br>2-roll vertical |
|---|---|
| Roll Drives | individual |
| Roll Heating | individual |
| Roll Diameter | 12" |
| Roll Face | 24" |

EXAMPLE 1

This example illustrates calender laminating heavy paper stock with low density polyethylene coatings on two sides in a single roll pass.

The polyethylene resin used was a 0.924 density, 4.0 melt index resin containing 0.1 percent antioxidant and 0.2 percent roll release agent. The web stock was bleached paper board weighing 235 lbs/ream.

The equipment units used were extruder No. 3 combined with the calendar through an extruder calender die with a central slot, as shown in FIGS. 3 and 4.

The extruder/die combination was operated under the following conditions:

| Barrel Temperatures, Rear-to-Front | 145°C/205°C/260°C/320°C. |
|---|---|
| Melt Temperature | 310°C. |
| Melt Pressure (before valves) | 1000 psi. |
| Die Temperature | 250°C. |
| Screw Speed | 150 rpm |
| Throughput rate | 147 lbs/hr |

The calender was operated under the following conditions:

| Roll temp., top roll | 22°C. |
|---|---|
| Roll speed, top roll | 850 fpm |
| Roll temp., bottom roll | 25°C. |
| Roll speed, bottom roll | 900 fpm |

Under these conditions, very uniform polyethylene coatings of 0.5 - 1.5 mils or about 5-20 lbs/ream were deposited with excellent adhesion to the paper board. The coating thickness on each side could be readily adjusted by means of the valves connecting the extruder and each die manifold.

Polyethylene coated paper board of the described type is useful in many packaging applications, for example in making milk cartons. The paper may be printed before laminating or the final laminate may be printed afterwards. The polyethylene coatings make the paper board impermeable to liquids and heat sealable. Laminates of this type have heretofore been made by sequential coating of each side of the paper board as disclosed hereinabove.

EXAMPLE 2

This example describes calender laminting a metal/plastic composite having either three metal foil and two plastic plies or two metal foil layers bonded together with a single layer of plastic.

The plastic used in this experiment was 0.96 density, 8.0 MI polyethylene containing 0.1 percent antioxidant. The metal foil used was 2S aluminum foil of 2.5 mil thickness, sulfo-chromate treated before lamination to secure good adhesion to the polyethylene.

The equipment units used were extruder No. 2 connected to the calender through a dual manifold die with a center slot as shown in FIGS. 3 and 4.

The extruder was operated under the following conditions:

| Barrel Temperatures, Rear-to-Front | 150°C/160°C/170°C/175°C |
|---|---|
| Melt Temperature | 200°C. |
| Melt Pressure (before valve) | 2000 psi |
| Die Temperature | 190°C. |
| Screw Speed | 120 rpm |
| Throughput rate | 250 lbs/hr. |

The calender was operated under the following conditions:

| Roll temperature, top roll | 140°C. |
|---|---|
| Roll temperature, bottom roll | 150°C. |

The extruder/die/calender was threaded up as shown in FIGS. 3–4 with three aluminum foils feeding into the nip, namely a center foil (32) and two external foils (36 and 38). The roll nip opening and the roll speeds was varied to make laminates varying in over-all thickness from 15 mils to 150 mils. Feeding of the center foil (32) was discontinued, the die slot (30) was closed with an insert and laminates without the center foil were made in the same thickness range by roll nip and roll speed adjustment without changing the extruder operation.

The aluminum/polyethylene laminate made by this process is useful as a replacement for sheet metal in many applications involving stampings and ductwork. It is lighter and less costly than similar all-metal sheeting. In the past, laminates of this type have been made either by press lamination or by sequential lamination requiring much more costly and elaborate equipment than that disclosed here.

EXAMPLE 3

This example describes calender laminating glass mat reinforced polypropylene composites having two plies of plastic and three plies of glass reinforcement by passage through a single roll nip.

The polypropylene resin used had a density of 0.905 (ASTM D-792-50) and a flow index of 3.5 decigrams/minute at 230° C. and 44 psi (ASTM D-1238). The glass mat used was a continuous strand glass mat weighing 1.5 oz/ft$^2$. The mat was made from E-glass fibers having an average diameter of 0.3 mils.

The equipment units and arrangements was the same as that of Example 2.

The extruder was operated at the following conditions:

| Barrel Temperatures, Rear-to Front | 180°C/200°C/220°C./230°C. |
|---|---|
| Melt Temperature | 240°C. |
| Die Temperature | 220°C. |
| Melt Pressure (before valve) | 2,000 psi |
| Valve Section | adjusted |
| Throughput Rate | 210 lbs/hr |

The calender was operated at the following conditions:

| | |
|---|---|
| Top roll, temperature | 150°C. |
| Top roll, speed | 10 fpm |
| Bottom roll, temperature | 160°C. |
| Bottom roll, speed | 11 fpm |

The equipment was threaded up supplying the glass mat through the center slot (32) of the die as well as along each roll surface (36 and 38). The roll nip opening and die positioning were adjusted to give a final laminate about 90 mil in thickness containing about 50 percent glass by weight.

The resulting laminate showed good wetting and resin penetration of the glasss mat by the plastic in spite of the relatively high rate of lamination for this type of material. Also, the glass mats showed virtually no distortion as a result of the lamination.

Thermoplastic laminates of this type are useful for automative, appliance and furniture parts. When softened by pre-heating, they can be cold stamped similarly to sheet metal into three-dimensional shapes at high rates and usually with simpler tooling that in required for metal stamping. Current systems for making such laminates consist of sheet laminating in hydraulic presses or belt laminating at low pressures. Both systems are expensive and cumbersome in comparison with the direct making of continuous laminates as described in the present disclosure.

EXAMPLE 4

This example describes calender laminating rigid PVC foam core laminates faced with non-porous skins of the same composition in a single roll pass.

The vinyl compound used had the following composition:

| Component | Trade Name | Manufacturer | % |
|---|---|---|---|
| PVC resin | QSQH-7 | Union Carbide | 94.5 |
| Resin Modifier | KM-120N | Rohm & Haas | 2.- |
| Stabilizer | TM-181 | Advance | 1.- |
| Lubricant | Ca-stearate | — | 1.- |
| -N- | Wax C | Hoechst | 0.5 |
| Blowing Agent | Celogen AZ | U.S. Rubber Co. | 1 |
| | | | 100.- |

QSQH is a vinyl chloride/ethylene copolymer containing about one percent ethylene and having an inherent viscosity of 0.78 (0.2 g in 100 ml cyclohexanone at 30° C.)

The basic equipment units used were two extruders of type No. 2 combined with the calender. The units were connected through a three-stream die as shown in FIGS. 5 and 6.

One of the extruders was used to feed an expandable center stream of the above formulation through the center manifold (30) in the extruder/calender die (10) the other extruder was used to feed the same formulation without blowing agent through the outer manifolds (13 and 16) in the die. The extruders were both operated at the following conditions.

| | |
|---|---|
| Barrel Temperatures, Rear-to-Front | 145°C/150°C/150°C/145°C |
| Melt Temperature | 170°C. |
| Melt Pressures (before valve section) | 100 psi |
| Die Temperature | 160°C. |
| Valve Sections | adjusted |
| Throughput rates | 150 lbs/hr |

The calender was operated at the following conditions:

| | |
|---|---|
| Top Roll, Temperature | 150°C. |
| Top Roll, Speed | 40 fpm |
| Bottom Roll, Temperature | 160°C. |
| Bottom Roll, Speed | 42 fpm |

The emerging sheet had a uniformly foamed core about 55–60 mils thick and uniform, non-foamed skins about 10 mils thick. Simply by adjusting the valves on one or both of the extruders, the ratio between skin and foam core thickness could be readily varied. Similarly, the over-all thickness of the emerging laminate was readily varied by commensurate adjustments in the roll nip opening and roll speeds.

Rigid PVC foam boards are useful as non-flammable boards and sheeting for construction and transportation applications. The cellular core reduces weight and cost and provides valuable insulating properties. The solid skin provides excellent wear resistance and a good surface for printing, decorative coatings or for inline or post embossing. Foam core laminates of this type were difficult to make in the past except by post laminating foam and sheeting.

EXAMPLE 5

This example describes calender laminating of foam cored polyamid sheeting reinforced with chopped glass fibers and having non-porous skins of the same composition.

The polyamid/glass formulation used had the following composition:

| Component | Trade Name | Manufacturer | % |
|---|---|---|---|
| Nylon 6 | 8203 C | Allied Chemical | 88.7 |
| Antioxidant | Aminox | U.S. Rubber Co. | 0.5 |
| Antioxidant | Flexamine | U.S. Rubber Co. | 0.5 |
| Lubricant | Stearic Acid | — | 0.3 |
| Chopped fiberglass Fiberglas | OCF 411 (½") | Owens-Corning | 10.- |

The equipment arrangement was the same as in Example 4 except the extruders used were of type 3. The extruders were both operated at the following conditions:

| | |
|---|---|
| Barrel Temperatures, Rear-to-Front | 235°C/240°C/240°C |
| Melt Temperature | 245°C. |
| Die Temperature | 240°C. |
| Melt Pressure (before valve) | 1500 psi |
| Valve section | adjusted |
| Throughput rate | 87 lbs/hr |

The calender was operated at the following conditions:

| | |
|---|---|
| Top Roll, Temperature | 170°C. |
| Top Roll, Speed | 10.0 fpm |
| Bottom Roll, Temperature | 180°C. |
| Bottom Roll, Speed | 10.5 fpm |

After establishing proper operating conditions for the extruder/die/calender combination, a solid sheet of about 30–35 mils was produced by joining the melt streams through manifolds 13, 16 and 30 in the calender nip. The gas inlet port on the extruder feeding the center manifold (30) was then connected to a nitrogen cylinder and nitrogen was introduced into the extruder barrel at a pressure of 500 psi. The sheet emerging from the rolls now had a foam core center about 40 mils thick enveloped by two solid skins each about 7-8 mils thick. As in the previous example, the ratio between the skin and the foam core was adjustable by varying the valve settings on either or both extruders. Also as before, by adjusting the roll speeds and nip opening, the over-all thickness of the foam-cored laminate could be varied. In addition, however, due to the freedom of adjusting the amount of gas available for expansion, the expansion ratio of the foam core was readily variable by the pressure setting on the nitrogen valve connected to the extruder. Marked variations in the expansion ratio were possible without impairment of the cell structure of the foam.

Glass reinforced, foam cored Nylon board is a stiff, strong and tough board with many potential industrial applications, especially where high temperature rigidity is important. Examples are as replacement for plywood and various composite boards now used for shipping containers, truck bodies, etc. This type of board has been difficult to make in an economical way in the past.

EXAMPLE 6

This example shows calender laminating of foam cored polystyrene sheeting having non-porous surface skins of rubber modified (high impact) polystyrene.

The polystyrene compound used for the foam core melt stream (manifold 30) had a melt viscosity (160°C.) at unit shear rate of 5.8 lbs. sec./in$^2$ (Co) and a power law exponent of $-0.74$ (n). The polystyrene beads were steeped in n-pentane to a final concentration of 5 wt.% before use. The rubber modified polystyrene used for the external melt streams (manifolds 13 and 16) had a Co value of 9.2 and an n-value of $-0.78$ (160° C.). The rubber modified polystyrene was used as is, i.e., without any treatment with pentane.

The equipment arrangement was as in example 4 except that an extruder of type No. 2 was used to provide the stream of expandable polystyrene for the central manifold (30) whereas an extruder of type No. 1 was used to provide the streams of impact polystyrene for the external manifolds (13 and 16).

The extruders were operated at the following conditions:

| | | Extr No. 2 | Extr No. 1 |
|---|---|---|---|
| Barrel Temps., | Rear | 125°C. | 130°C. |
| do. | Middle(1) | 150°C. | 140°C. |
| do. | Middle(2) | 145°C. | 150°C. |
| do. | Front | 125°C. | 155°C. |
| Melt Temps. | | 135°C. | 150°C. |
| Die Temps. | | 125°C. | 140°C. |
| Valve Sections | | open | adjusted |
| Throughput Rates | | 100lbs/hr | 50 lbs/hr |

The calender was operated at the following conditions:

| | |
|---|---|
| Top Roll, Temperature | 110°C. |
| Top Roll, Speed | 2 fpm |
| Bottom Roll, Temperature | 115°C. |
| Bottom Roll, Speed | 2 fpm |

The sheet emerging from the calender had a total thickness (after full expansion) of 0.280 inch with a foamed core and two external skins each about 20 mils thick. The central cellular section of styrene homopolymer had a uniform pore structure and the outer layers of rubber modified polystyrene were free from perforations and had excellent surface appearance.

Styrene homopolymer is a very brittle material in its normal state. However, when it is expanded at a low temperature as in the present example, it develops considerable toughness due to orientation. On the other hand, an unoriented skin of polystyrene would remain quite brittle, thus negating the improvement in toughness achieved due to orientation of the foam core. This common difficulty is circumvented here by the use of rubber modified polystyrene which has good toughness in the unoriented state.

Polystyrene laminates of this type are desirable for many applications in that they utilize the low cost of polystyrene and the good properties of rubber modified polystyrene. In contrast to earlier laminating apparatus, the present apparatus is simple and inexpensive, thus enabling new combinations of traditional materials for optimum combinations of performance and cost as illustrated by this example.

What is claimed is:

1. Apparatus for the calendering of laminated polymeric materials, comprising a pair of cylindrical counter-rotating calender rolls positioned to define therebetween a nip opening, and volumetric obstruction means positioned across the width and between said pair of calender rolls, said obstruction means projecting into the space between said pair of calender rolls so as to at least penetrate the bank material otherwise formed between the pair of calender rolls upstream of the nip by the selection of calendering conditions, said obstruction means having a central slot across its width for the feeding of a web of laminating material to said pair of calender rolls enclosed between two side slots for the extrusion of two streams of polymeric material to said pair of calender rolls.

2. Apparatus in accordance with claim 1, wherein said pair of calender rolls is equal in radius and said volumetric obstruction means is symmetrically shaped in cross-section and symmetrically positioned with respect to the pair of calender rolls.

3. Apparatus for the direct extrusion-calendering of laminated polymeric materials comprising sheet extruder means for producing two sheets of extruded polymeric material, a pair of cylindrical counter-rotating calender rolls positioned to define therebetween a nip opening, and volumetric obstruction means positioned across the width and between said pair of calender rolls, said obstruction means projecting into the space between said pair of calender rolls so as to at least penetrate the bank of material otherwise formed between the pair of calender rolls upstream of the nip by the selection of calendering conditions and having an axial slot across its width for the feeding of a web of laminating material through said calender rolls, the clearances between said volumetric obstruction means and each of said calender rolls being such as to permit the unobstructed passage of each of said two streams of extruded polymeric meterial to freely pass therebetween and join with said web of laminating material upon passage thru said nip opening.

4. Apparatus in accordance with claim 3, wherein said pair of calender rolls is equal in radius and said volumetric obstruction means is symmetrically shaped in cross-section and symmetrically positioned with respect to the pair of calender rolls.

* * * * *